United States Patent
Chen

(10) Patent No.: US 10,390,007 B1
(45) Date of Patent: Aug. 20, 2019

(54) METHOD AND SYSTEM FOR PANORAMIC 3D VIDEO CAPTURE AND DISPLAY

(71) Applicant: Scott Zhihao Chen, Irvine, CA (US)

(72) Inventor: Scott Zhihao Chen, Irvine, CA (US)

( * ) Notice: Subject to any disclaimer, the term of this patent is extended or adjusted under 35 U.S.C. 154(b) by 447 days.

(21) Appl. No.: 15/149,178

(22) Filed: May 8, 2016

(51) Int. Cl.
| | |
|---|---|
| *H04N 13/366* | (2018.01) |
| *H04N 5/232* | (2006.01) |
| *H04N 13/117* | (2018.01) |
| *H04N 13/161* | (2018.01) |
| *H04N 13/383* | (2018.01) |
| *H04N 13/125* | (2018.01) |
| *H04N 13/128* | (2018.01) |
| *H04N 13/111* | (2018.01) |
| *H04N 5/341* | (2011.01) |
| *H04N 13/189* | (2018.01) |
| *H04N 13/243* | (2018.01) |
| *H04N 13/282* | (2018.01) |

(52) U.S. Cl.
CPC ....... *H04N 13/366* (2018.05); *H04N 5/23238* (2013.01); *H04N 5/3415* (2013.01); *H04N 13/111* (2018.05); *H04N 13/117* (2018.05); *H04N 13/125* (2018.05); *H04N 13/128* (2018.05); *H04N 13/161* (2018.05); *H04N 13/383* (2018.05); *H04N 13/189* (2018.05); *H04N 13/243* (2018.05); *H04N 13/282* (2018.05)

(58) Field of Classification Search
CPC .. H04N 13/366; H04N 13/111; H04N 13/117; H04N 13/125; H04N 13/128; H04N 5/23238; H04N 5/3415
See application file for complete search history.

(56) References Cited

U.S. PATENT DOCUMENTS

| | | | | | |
|---|---|---|---|---|---|
| 5,703,961 | A | * | 12/1997 | Rogina | G06K 9/209 |
| | | | | | 382/154 |
| 6,141,034 | A | * | 10/2000 | McCutchen | G02B 27/22 |
| | | | | | 348/36 |
| 6,327,381 | B1 | * | 12/2001 | Rogina | G06T 15/10 |
| | | | | | 382/154 |

(Continued)

FOREIGN PATENT DOCUMENTS

CN 108471487 A * 8/2018 ........... H04N 5/2251

OTHER PUBLICATIONS

D. Kim, D. Min, & K. Sohn, "A Stereoscopic Video Generation Method Using Stereoscopic Display Characterization and Motion Analysis", 54 IEEE Transactions on Broadcasting 188-197 (Jun. 2008) (Year: 2008).*

(Continued)

*Primary Examiner* — David N Werner

(57) ABSTRACT

Panoramic three-dimensional (3D) imaging systems for capturing stereoscopic video images and presenting 3D video images to a viewer based on the captured stereoscopic video images are disclosed. In some embodiments, the described systems use a proposed parallax vector to encode captured stereoscopic video images in real-time when the raw video images are being captured. During panoramic video playback, the computed parallax vectors are used to reproduce stereoscopic video images based on the angle of view of an audience relative to a display screen before outputting the stereoscopic video images to the left and right eyes of the audience to create the realistic 3D experience.

16 Claims, 7 Drawing Sheets

(56) References Cited

U.S. PATENT DOCUMENTS

| | | | | |
|---|---|---|---|---|
| 8,390,674 B2* | 3/2013 | Kim | ............... | G06K 9/00604 |
| | | | | 348/42 |
| 2009/0102915 A1* | 4/2009 | Arsenich | ............... | G02B 5/10 |
| | | | | 348/53 |
| 2012/0200676 A1* | 8/2012 | Huitema | ............ | H04N 13/378 |
| | | | | 348/51 |
| 2013/0293691 A1* | 11/2013 | Saito | ............... | G02B 27/2214 |
| | | | | 348/59 |
| 2014/0098186 A1* | 4/2014 | Seidl | ............ | G06T 15/10 |
| | | | | 348/36 |
| 2016/0065947 A1* | 3/2016 | Cole | ............... | H04N 19/597 |
| | | | | 348/43 |
| 2016/0353089 A1* | 12/2016 | Gallup | ............... | G02B 27/0172 |
| 2016/0353090 A1* | 12/2016 | Esteban | ............ | G02B 27/0172 |

OTHER PUBLICATIONS

R.S. Allison, "The Camera Convergence Problem Revisited", 11 Stereoscopic Displays & Virtual Reality Systems 167-178 (Year: 2004).*

M. Paul, C.J. Evans & M. Murshed, "Disparity-Adjusted 3D Multi-View Video Coding with Dynamic Background Modeling", Proc. of the 2013 IEEE Int'l Conf. on Image Processing (Sep. 2013) (Year: 2013).*

Machine translation of CN 108471487 A (Year: 2019).*

* cited by examiner

METHOD AND SYSTEM FOR PANORAMIC 3D VIDEO CAPTURE AND DISPLAY

TECHNICAL FIELD

The present disclosure generally relates to the field of panoramic imaging, and more specifically to systems and techniques for capturing and presenting 3D panoramic videos.

BACKGROUND

Panoramic photography, the taking of a photograph or photographs covering an elongated field of view, has a long history in photography. Perhaps the most primitive method of panoramic photography is the taking of several adjoining photos with a conventional camera and then mounting the prints together in alignment to achieve a complete panorama. Modern techniques adapt this method by using digital cameras to capture the images, and then using computer image processing techniques to align the images for printing as a single panorama.

The continuous development of digital camera technologies along with constantly increasing speed and processing power of computers have laid the foundation for digital imaging systems that are capable of acquiring image data for the automatic creation of wide to entire 360° panoramas, including both still panoramic images and dynamic panoramic movies.

Currently, 360-degree panoramic videos have provided viewers with an excellent video immersion experiences. However, to further increase the realism and the feeling of "presence" for a viewer when watching a panoramic movie thereby archiving a true "virtual reality," it is necessary to capture 3-dimensional (3D) panoramic video images and subsequently display panoramic video images in 3D to the viewer.

SUMMARY

Described herein are systems and techniques for capturing panoramic stereoscopic video images and presenting 3D video images to a viewer based on the captured stereoscopic video images in a panoramic movie environment. In some embodiments, the described system and technique uses a proposed parallax vector to encode captured stereoscopic video images in real-time when the raw video images are being captured. During panoramic video playback, the computed parallax vectors are used to reproduce stereoscopic video images based on the angle of view of an audience relative to a display screen before outputting the stereoscopic video images to the left and right eyes of the audience to create the realistic 3D experience. The proposed technique does not require performing either the 3D model construction or computing the depth for the target objects, thus greatly reducing the amount of computation for 3D video image processing.

In one aspect, a process of presenting 3D video images to a viewer based on stereoscopic video images captured by a panoramic 3D imaging system is disclosed. This process starts by receiving raw video images capturing by the panoramic 3D imaging system, wherein each target object within the raw video images appears in a pair of stereoscopic video images captured by two cameras of the panoramic 3D imaging system in a stereoscopic camera configuration. Next, for each target object within the raw video images, the process generates a parallax vector based on the pair of associated stereoscopic video images. The generated parallax vectors are subsequently encoded with the pair of associated stereoscopic video images. Next, during panoramic 3D video image playback in a panoramic setting, the process also includes: reproducing each pair of stereoscopic video images in the raw video images based on the parallax vectors associated with the pair of stereoscopic video images and a current angle of view of a viewer's eyes; and outputting two video images in each pair of the reproduced stereoscopic video images to the viewer's left and right eyes, respectively at the current angle of view to create a realistic 3D feel for the viewer.

In some implementations, the process generates the parallax vector for each target object by: determining a first location of the target object projected onto a remote background based on one image of the pair of stereoscopic video images containing the target object; determining a second location of the target object projected onto the remote background based on the other image of the pair stereoscopic video images containing the target object; and determining the parallax vector as a vector pointing from the first location to the second location in the remote background.

In some implementations, the process reproduces each pair of stereoscopic video images by: determining the current angle of view of the viewer's eyes with respect to a screen; modifying each encoded parallax vector associated with the pair of stereoscopic video images based on the determined current angle of view; and reproducing the pair of stereoscopic video images based on the modified parallax vectors.

In some implementations, the process modifies each encoded parallax vector based on the determined current angle of view by: determining a first angle formed between the left and right eyes of the viewer and the target object when the viewer is at a normal angle of view facing forward toward the screen; determining a second angle formed between the left and right eyes of the viewer and the target object when the viewer is situated as the determined current angle of view; computing a scaling factor based on the first angle and the second angle; and modifying the encoded parallax vector by linearly scaling the encoded parallax vector with the scaling factor.

In another aspect, a panoramic 3D imaging system is disclosed. This system includes a housing and a plurality of cameras which is divided into a first group of cameras arranged in a top plane, a second group of cameras arranged in a middle plane, and a third group of cameras arranged in a bottom plane. The plurality of cameras is arranged such that a target object in a given direction is captured in at least two stereoscopic video images by at least two cameras in the plurality of cameras, and the at least two cameras are in a stereoscopic camera configuration. In some embodiments, the first group of cameras includes 4 cameras, the second group of cameras includes 8 cameras, and the third group of cameras includes 4 cameras. Hence, the plurality of cameras is configured to capture 360°×180° full spherical panoramic stereoscopic video images. In some embodiments, the panoramic 3D imaging system further includes a controller configured to command each of the plurality of cameras to acquire raw video images.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Features of the subject technology are set forth in the appended claims. However, for purpose of explanation, several embodiments of the subject technology are set forth in the following figures.

DETAILED DESCRIPTION

Figure 1:
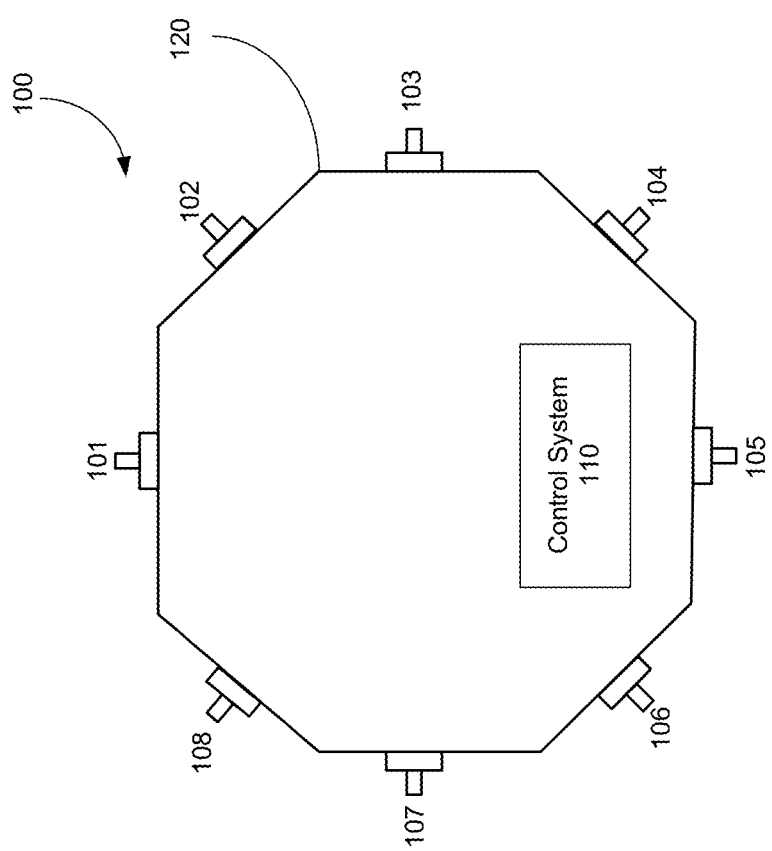
FIG. 1 is a schematic top view of an example panoramic 3D imaging system according to some embodiments of the present disclosure.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

Described herein are systems and techniques for capturing panoramic stereoscopic video images and presenting 3D video images to a viewer based on the captured stereoscopic video images in a panoramic movie environment. In some embodiments, the described system and technique uses a proposed parallax vector to encode captured stereoscopic video images in real-time when the raw video images are being captured. During panoramic video playback, the computed parallax vectors are used to reproduce stereoscopic video images based on the angle of view of an audience relative to a display screen before outputting the stereoscopic video images to the left and right eyes of the audience to create the realistic 3D experience. The proposed technique does not require performing either the 3D model construction or computing the depth for the target objects, thus greatly reducing the amount of computation for 3D video image processing.

In one aspect, a process of presenting 3D video images to a viewer based on stereoscopic video images captured by a panoramic 3D imaging system is disclosed. This process starts by receiving raw video images capturing by the panoramic 3D imaging system, wherein each target object within the raw video images appears in a pair of stereoscopic video images captured by two cameras of the panoramic 3D imaging system in a stereoscopic camera configuration. Next, for each target object within the raw video images, the process generates a parallax vector based on the pair of associated stereoscopic video images. The generated parallax vectors are subsequently encoded with the pair of associated stereoscopic video images. Next, during panoramic 3D video image playback in a panoramic setting, the process also includes: reproducing each pair of stereoscopic video images in the raw video images based on the parallax vectors associated with the pair of stereoscopic video images and a current angle of view of a viewer's eyes; and outputting two video images in each pair of the reproduced stereoscopic video images to the viewer's left and right eyes, respectively at the current angle of view to create a realistic 3D feel for the viewer.

In another aspect, a panoramic 3D imaging system is disclosed. This system includes a housing and a plurality of cameras which is divided into a first group of cameras arranged in a top plane, a second group of cameras arranged in a middle plane, and a third group of cameras arranged in a bottom plane. The plurality of cameras is arranged such that a target object in a given direction is captured in at least two stereoscopic video images by at least two cameras in the plurality of cameras, and the at least two cameras are in a stereoscopic camera configuration. In some embodiments, the first group of cameras includes 4 cameras, the second group of cameras includes 8 cameras, and the third group of cameras includes 4 cameras. Hence, the plurality of cameras is configured to capture 360°×180° full spherical panoramic stereoscopic video images. In some embodiments, the panoramic 3D imaging system further includes a controller configured to command each of the plurality of cameras to acquire the raw video images.

FIG. 1 is a schematic top view of an example panoramic three-dimensional (3D) imaging system according to certain aspects of the disclosure. Not all of the depicted components may be used, however, and one or more implementations may include additional components not shown in the figure. Variations in the arrangement and type of the components may be made without departing from the scope of the subject technology. Additional components, different components, or fewer components may be provided.

As shown in FIG. 1, panoramic 3D imaging system 100 of FIG. 1 includes cameras 101-108, a control system 110, and housing 120. Each of cameras 101-108 may be a digital camera. In some aspects, each of cameras 101-108 may include a wide-angle lens (e.g., fisheye lens) to capture image data. The horizontal angle of view of a wide-angle lens may be greater than 90 degrees and the vertical angle of view of a wide-angle lens may be greater than 90 degrees. FIG. 1 shows cameras 101-108 are distributed evenly across on a frame of housing 120, for example, on eight vertices of the frame with an octagon shape. Each of cameras 101-108 may face a ¼ of a 360° field, so that each direction of view will be covered by at least two cameras. It can be appreciated that cameras 101-108 may be distributed in any other arrangement and each of cameras 101-108 may face any portion of a 360° field. Furthermore, panoramic 3D imaging system 100 may include additional cameras not shown in FIG. 1. For example, panoramic 3D imaging system 100 may include multiple layers of cameras and the eight cameras shown in FIG. 1 may represent a single layer of cameras in the multi-layer camera system. One exemplary multi-layer panoramic 3D imaging system is described in more detail in conjunction with FIG. 3.

The control system 110 may include one or more electronic circuitries, such as a system on chip (SOC) with A field-programmable gate array (FPGA), Accelerated Processing Unit (APU) and peripheral electronic circuitries, for processing the image data captured by cameras 101-108 to produce wide to entire 3600 panoramas, including both still images and movies. It can now be appreciated that outputs of panoramic imaging system 100 may be panoramas stitched from a set of original images captured by cameras 101-108.

Cameras 101-108 and the control system 110 may be enclosed in housing 120, such as a protective housing to reduce environmental effects on the components. In some embodiments, the protective housing is waterproof, dust-proof, shockproof, freeze-proof, or any combination thereof. In some aspects, housing 120 may include one or more mechanical parts for mounting, housing and/or moving the cameras 101-108 and/or other optical components. Furthermore, in some embodiments, cameras 101-108 can be reversibly coupled to or detached from the remaining system, such that an end user may select different models of cameras 101-108 to be used with panoramic imaging system 100 according to particular needs or preferences.

It can be appreciated that a variety of embodiments of cameras 101-108 may be employed. These embodiments may have different numbers and/or arrangements of cameras than cameras 101-108, but a common feature may be that each camera's field of view overlaps with that of at least one other camera, thereby enabling panoramic imaging system 100 to capture a total field of view according to the design. Another common feature may be that the number and arrangement of cameras in system 100 will ensure that, when panoramic 3D imaging system 100 is used to shoot panoramic videos, target objects in any given direction are captured by at least two cameras in system 100 so that the target object show up in at least two binocular-vision/stereoscopic video images to be used to construct 3D images of the target objects.

Those of ordinary skills in the art upon reading the present disclosure should become aware of how a panoramic imaging system according to the present disclosure can be designed to satisfy particular needs. Particularly, skilled persons in the art would follow the guidance provided by the present disclosure to select a suitable number of cameras with reasonable fields of view and arrange the set of cameras such that neighboring cameras' fields of view have reasonable overlap that enables the system to cover a desirable total field and reliably process image information in the overlapping field to produce panoramas.

Figure 2:
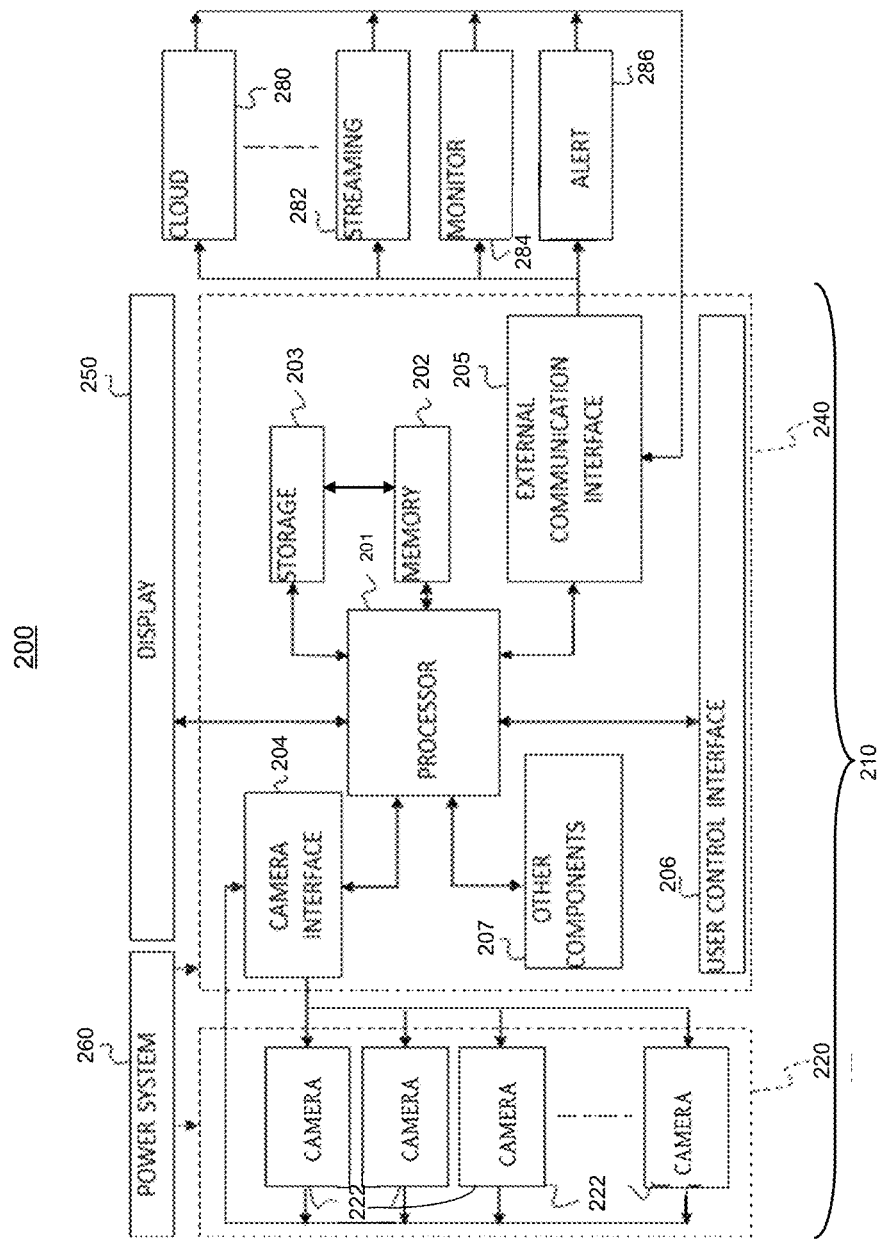
FIG. 2 conceptually illustrates an exemplary electronic system including a panoramic 3D imaging system and various peripheral modules configured in an internet-enabled application environment with which some implementations of the subject technology can be implemented.

FIG. 2 conceptually illustrates an exemplary electronic system 200 including a panoramic 3D imaging system 210 and various peripheral modules configured in an internet-enabled application environment with which some implementations of the subject technology can be implemented. Not all of the depicted components may be used, however, and one or more implementations may include additional components not shown in the figure. Variations in the arrangement and type of the components may be made without departing from the scope of the subject technology. Additional components, different components, or fewer components may be provided.

Exemplary panoramic 3D imaging system 210 within exemplary panoramic imaging electronic system 200 may be implemented by panoramic imaging system 100 as described above with reference to FIG. 1. According to the present disclosure, the example panoramic imaging system 210 further includes an optical system 220 which includes a plurality of cameras 222, and a control system 240 that controls the functions of the optical system 220 and includes at least an image processing program to process image data output from optical system 220. The plurality of cameras 222 may be implemented by cameras 101-108 in system 100. However, the plurality of cameras 222 may include more cameras than cameras 101-108 in system 100.

Control system 240 described in FIG. 2 may be used to implement control system 110 described in FIG. 1. Particularly, the control system 240 includes at least a processor 241, a memory 242, a storage device 243, a camera interface 244, an external communication interface 245, and a user control interface 246. The control system 240 can be a general-purpose computer system such as a Personal Computer (PC), or preferably a custom-designed computing system. Particularly in some embodiments, the control system 240 is a system on chip (SOC); that is, an integrated circuit (IC) integrates all components and functions of the control system 240 into a single chip, which makes the present panoramic imaging system 210 portable and electronically durable as a mobile device. In some embodiments, the control system 240 may be located internally within a same housing where the optical system 220 is located. Alternatively, in other embodiments, the control system 240 is separated from the optical system 220 to allow end users' selection of different models of an optical system 220 to be used with the control system 240.

The storage device 203 is preloaded with at least the image processing programs of the present disclosure, including stereoscopic video image capturing and 3D video image playback programs. The stereoscopic video image capturing programs may include real-time parallax vector field generation programs described in more detail below. Other customer-designed software programs may be preloaded during manufacture or downloaded by end users after they purchase the system. Exemplary customer-designed software programs to be used with the present panoramic imaging system include but are not limited to software that further processes panoramic images or videos according to an end user's needs, such as 3D modeling, object tracking, and virtual reality programs. Further exemplary customer-designed software includes but is not limited to image editing programs that allow users to adjust color, illumination, contrast or other effects in a panoramic image, or film editing programs that allow users to select favorite views from a panoramic video to make normal videos.

The electronic circuitry in the processor 201 carries out instructions of the various algorithms. Thus, the various software programs, stored on the storage device 203 and executed in the memory 202 by the processor 201, direct the control system 240 to act in concert with the optical system 220 to perform various functions, which include but are not limited to receiving commands from an end user or an external device or service 280, 282, 284 and 286, defining the precise geometry of the cameras 222, commanding the cameras 222 to capture raw image data, tagging and storing raw data and sensor signals in a local storage device 203 and/or commuting raw data to an external device or service 280, 282, 284 and 286, processing raw video data and position sensor signals to compute angular and linear positions of optical system 220 and subsequently generate adjusted and stabilized panoramic videos to account for the shaking and other motion disturbances of optical system 220, presenting generated stabilized panoramas on a local display 250 and/or communicating generated stabilized panoramas to be stored or presented on an external device or service 280, 282, 284 and 286.

The processor 201 of the present disclosure can be any integrated circuit (IC) that is designed to execute instructions by performing arithmetic, logical, control and input/output (I/O) operations specified by algorithms. Particularly, the processor can be a central processing unit (CPU) and preferably a microprocessor that is contained on a single IC chip. In some embodiments, the control system 240 may employ a multi-core processor that has two or more CPUs or array processors that have multiple processors operating in parallel. In some embodiments, the processor 201 is an application specific integrated circuit (ASIC) that is designed for a particular use rather than for general purpose use. Particularly, in some embodiments, the processor 201 is a digital signal processor (DSP) designed for digital signal processing. More particularly, in some embodiments, the processor 201 is an on-chip image processor, specialized for image processing in a portable camera system. In some embodiments, the control system 240 includes a graphic processing unit (GPU), which has a massively parallel architecture consisting of thousands of smaller, more efficient cores designed for handling multiple tasks simultaneously. Particularly, in some embodiments, the control system 240 may implement GPU-accelerated computing, which offloads compute-intensive portions of an algorithm to the GPU while keeping the remainder of the algorithm to run on the CPU.

The memory 202 and the storage 203 of the present disclosure can be any type of primary or secondary memory device compatible with the industry standard, such as read-only memory (ROM), random access memory (RAM), electrically erasable programmable read-only memory (EE-PROM), and flash memory. In the embodiments where the control system 240 is a single chip system, the memory 202 and storage 203 blocks are also integrated on-chip with the processor 201 as well as other peripherals and interfaces. In some embodiments, the on-chip memory components may be extended by having one or more external solid-state storage media, such a secure digital (SD) memory card or a USB flash drive, reversibly connected to the imaging system. For example, the various memory units include instructions for removing an obstructing object in a panoramic image. From these various memory units, the processor 201 retrieves instructions to execute and data to process in order to execute the processes of some implementations.

The camera interface 204 of the present disclosure can be any form of command and data interface usable with a camera 222, such as a digital. The camera interface 204 of the present disclosure can also be any form of command and data interface to communicate with position sensors 224. Exemplary embodiments include USB, FireWire and any other interface for command and data transfer that may be commercially available. Additionally, it is preferred, although not required, that the optical system 220 be equipped with a single digital control line that would allow a single digital signal to command all the cameras 222 and sensors 224 simultaneously to capture an image of a scene and to acquire positional signals of the camera body.

The external communication interface 205 of the present disclosure can be any data communication interface, and may employ a wired, fiber-optic, wireless, or another method for connection with an external device or service 280, 282, 284 and 286. Ethernet, wireless-Ethernet, Bluetooth, USB, FireWire, USART, SPI are exemplary industry standards. In some embodiments, where the control system 240 is a single chip system, the external communication interface 205 is integrated on-chip with the processor 201 as well as other peripherals and interfaces.

The user control interface 206 of the present disclosure can be any design or mode that allows effective control and operation of the panoramic 3D imaging system from the user end, while the system feeds back information that aids the user's decision making process. Exemplary embodiments include but are not limited to graphical user interfaces that allow users to operate the system through direct manipulation of graphical icons and visual indicators on a control panel or a screen, touchscreens that accept users' input by touch of fingers or a stylus, voice interfaces which accept users' input as verbal commands and outputs via generating voice prompts, gestural control, or a combination of the aforementioned modes of interface.

Control system 240 of the present disclosure may further include other components 207 that facilitate its function. For example, control system 240 may optionally include a location and orientation sensor that could determine the location and orientation of the panoramic imaging system. Exemplary embodiments include a global positioning system (GPS) that can be used to record geographic positions where image data are taken, and a digital magnetic compass system that can determine the orientation of camera system in relation to the magnetic north. Control system 240 may optionally be equipped with a timing source, such as an oscillator or a phase-locked loop, which can be used to schedule automatic image capture, to time stamp image data, and to synchronize actions of multiple cameras to capture near simultaneous images in order to reduce error in image processing. Control system 240 may optionally be equipped with a light sensor for environmental light conditions, so that control system 240 can automatically adjust hardware and/or software parameters of the system.

In some embodiments, the present electronic system 200 is further equipped with an internal power system 260 such as a battery or solar panel that supplies the electrical power. In other embodiments, electronic system 200 is supported by an external power source. In some embodiments, electronic system 200 is further equipped with a display 250, such that panoramic photos may be presented to a user instantly after image capture, and panoramic videos may be displayed to a user in real time as the scenes are being filmed.

In some embodiments, the present electronic system 200 may be used in conjunction with an external device for displaying and/or editing panoramas generated. Particularly, the external device can be any electronic device with a display and loaded with software or applications for displaying and editing panoramic images and videos created by the present system. In some embodiments, the external device can be smart phones, tablets, laptops or other devices programmed to receive, display, edit and/or transfer the panoramic images and videos. In some embodiments, the present panoramic imaging system may be used in conjunction with an external service, such as Cloud computing and storage 280, online video streaming and file sharing 282, remote surveillance 284, and alert 286 for home and public security.

Panoramic 3D System Design and Video Signal Capturing

Figure 3A:
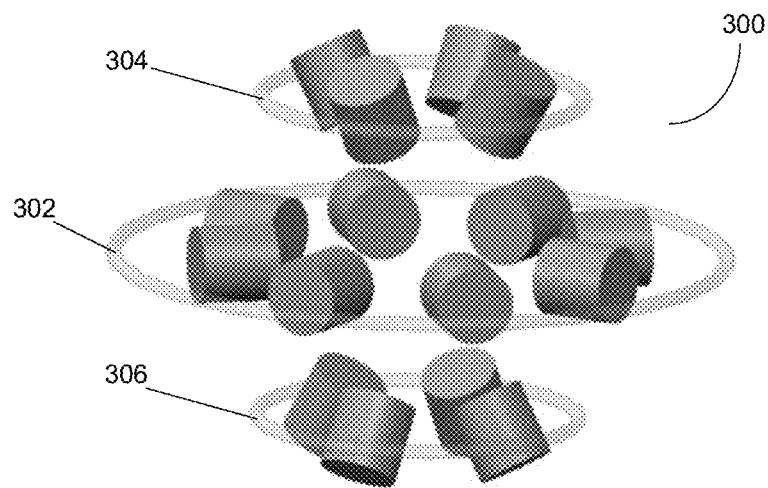
FIG. 3A illustrates a 3D schematic of a panorama 3D imaging system in accordance with some embodiments described herein.

Conventionally, to obtain 3D information of captured objects in a video scene, objects in each direction in the scene have to be captured by two or more cameras. FIG. 3A illustrates a 3D schematic of a panorama 3D imaging system 300 in accordance with some embodiments described herein. As can be seen in FIG. 3A, the proposed panorama 3D imaging system 300 includes 16 cameras which are arranged in three layers in space. More specifically, the middle layer 302 includes 8 cameras, and each of the top and bottom layers 304 and 306 includes 4 cameras. This spatial arrangement ensures that any given point in a 360°×180° full spherical panoramic image can be captured by at least two cameras. Moreover, a pair of adjacent cameras in system 300 is configured such that the two cameras create binocular vision effects.

Figure 3B:
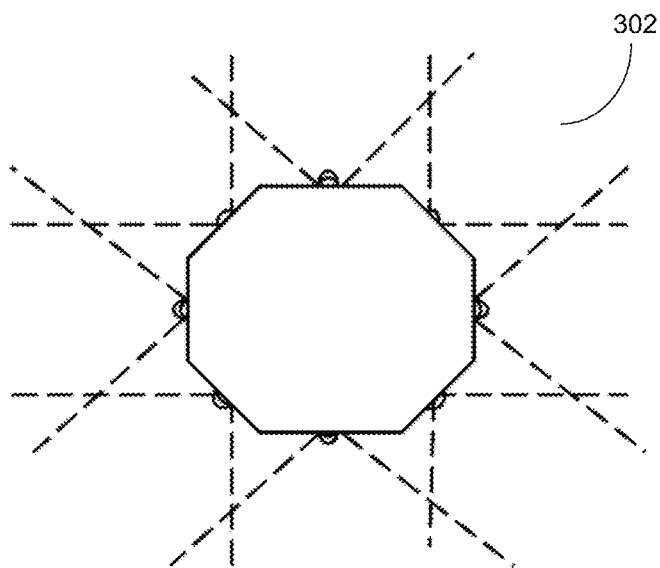
FIG. 3B shows a cross-sectional view of the middle layer of the panorama 3D imaging system in FIG. 3A in accordance with some embodiments described herein.

FIG. 3B shows a cross-sectional view of the middle layer 302 of imaging system 300 in FIG. 3A in accordance with some embodiments described herein. As can be seen in FIG. 3B, the field of views of a pair of adjacent cameras in the middle layer 302 overlap each other, and as such, each target point in space will be captured by two adjacent cameras when the target point is located within the region of overlap.

Although the embodiment shown in FIG. 3A is based on using 16 cameras in three layers, other embodiments of panorama 3D imaging systems can use a greater or fewer number of cameras arranged in a greater or fewer number of layers without departing from the scope of the present disclosure. For example, some panorama 3D imaging system designs may use 1, 2, or 4 layers of cameras and other panorama 3D imaging system designs may use 4, 6, 8, 10, 12, 14, 18, or 20 cameras. Each of these panorama 3D imaging system designs should ensure that target objects in the panoramic video images are captured by two or more cameras.

Panoramic 3D Video Playback

To playback the captured panoramic 3D video images in a panoramic environment with the 3D effect, a straightforward technique is based on the binocular vision principle. More specifically, before playing back the captured panoramic video images, a 3D reconstruction of the video images is performed. This includes, using the parallax effect of the binocular vision to compute the two distances between each target object in an image and the two cameras, and then to determine the three-dimensional (3D) coordinates of the target object as the position of the target object within a panoramic image. Notably, the 3D coordinates include the horizontal and vertical positions of the target object in the panoramic image, as well as a depth value Z of the target object. In some embodiments, when reconstructing 3D video images, a 3D model of the panoramic video images is constructed. Next, to playback the reconstructed panoramic 3D video images, geometric perspective principles are applied. This includes recalculating the projected images of each target object on the two eyes based on a user-selected angle of view. In this manner, 3D parallax effects can be reconstructed in the panoramic display environment.

One distinct feature of the disclosed technique is that, during panoramic 3D video playback, viewers are allowed to change their viewing angles, e.g., by rotating their heads to watch the surrounding scenes from different directions in order to create an immersive visual effect. To create and enhance this immersive visual effect from different viewing angles, in some embodiments, the reconstructed 3D video images include parameters (e.g., but not limited to the "parallax vector" described below) which can be used to recalculate 3D video images during playback based on the position and direction of viewers' heads, including viewing angle of viewer's eyes. Hence, during playback, the reconstructed panoramic 3D video images are first recalculated according to current position and direction of the viewer's head, and the recalculated panoramic 3D video images are then fed to a viewer's eyes at the current position and direction of the viewer's head.

Figure 4:
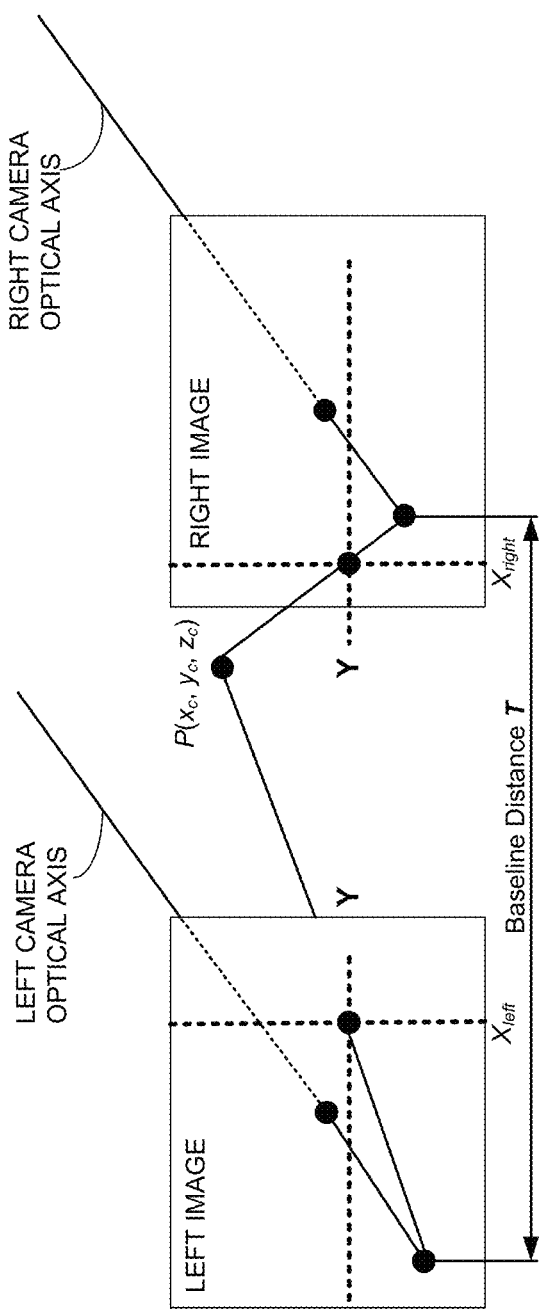
FIG. 4 presents a diagram illustrating the principle of generating the depth information of a target object based on the binocular disparity in accordance with some embodiments described herein.

FIG. 4 presents a diagram illustrating the principle of generating the depth information for a target object based on the binocular disparity in accordance with some embodiments described herein. As can be seen in FIG. 4, T is the baseline distance between the left and right stereoscopic cameras, and $x_{left}$ and $x_{right}$ represent the horizontal positions of an observation P captured on the left image and the right image of the left and right stereoscopic cameras, respectively. Notably, the depth of the observation point P and the parallax of point P in the two cameras are inversely proportional to each other. The parallax may be defined as $d=x_{right}-x_{left}$. Hence, the depth Z of the observation point P can be deduced using the principle of similar triangles:

$$(d-(x_{left}-x_{right}))/(Z-f)=(T/Z); \quad (1)$$

$$Z=f \times T/(x_{left}-x_{right}), \quad (2)$$

wherein d is the parallax of the observation point P, T is the baseline distance between the two cameras, and f is the focal length of each of the cameras.

Hence, as long as the parallax value of a target point can be measured, the depth information of the target point can be obtained. However, the above formulae (1) and (2) are valid only when a set of ideal model conditions are satisfied. These ideal model conditions include that the two cameras are both forward-facing toward the scene and parallel to each other. In some applications, the cameras are not configured in such a way. For example, in the panoramic 3D imaging system 300 shown in FIG. 3A, the two cameras of each pair used to create binocular visions are not parallel to each other. In such applications, it is necessary to mathematically compute the projection image and the distortion image, which can then be used to calibrate the left and right images captured by the two cameras so that they appear to be captured by two forward-facing and parallel cameras.

In some embodiments, to obtain the 3D coordinates of a target object, it is necessary to perform feature matching between the two stereoscopic images, and to compute the depth information for the object block-by-block. Next, the 3D model of the panoramic images can be constructed and output. However, in many high-definition applications, e.g., a super-high-definition video captured at 30 fps, the amount of computations based on such techniques is forbiddingly high. As a result, to process the large amount of raw panoramic 3D video data after shooting, the raw video data need to be uploaded to a backend server, which performs such computations and generates the final video images.

Introducing Parallax Vector

Figure 5:
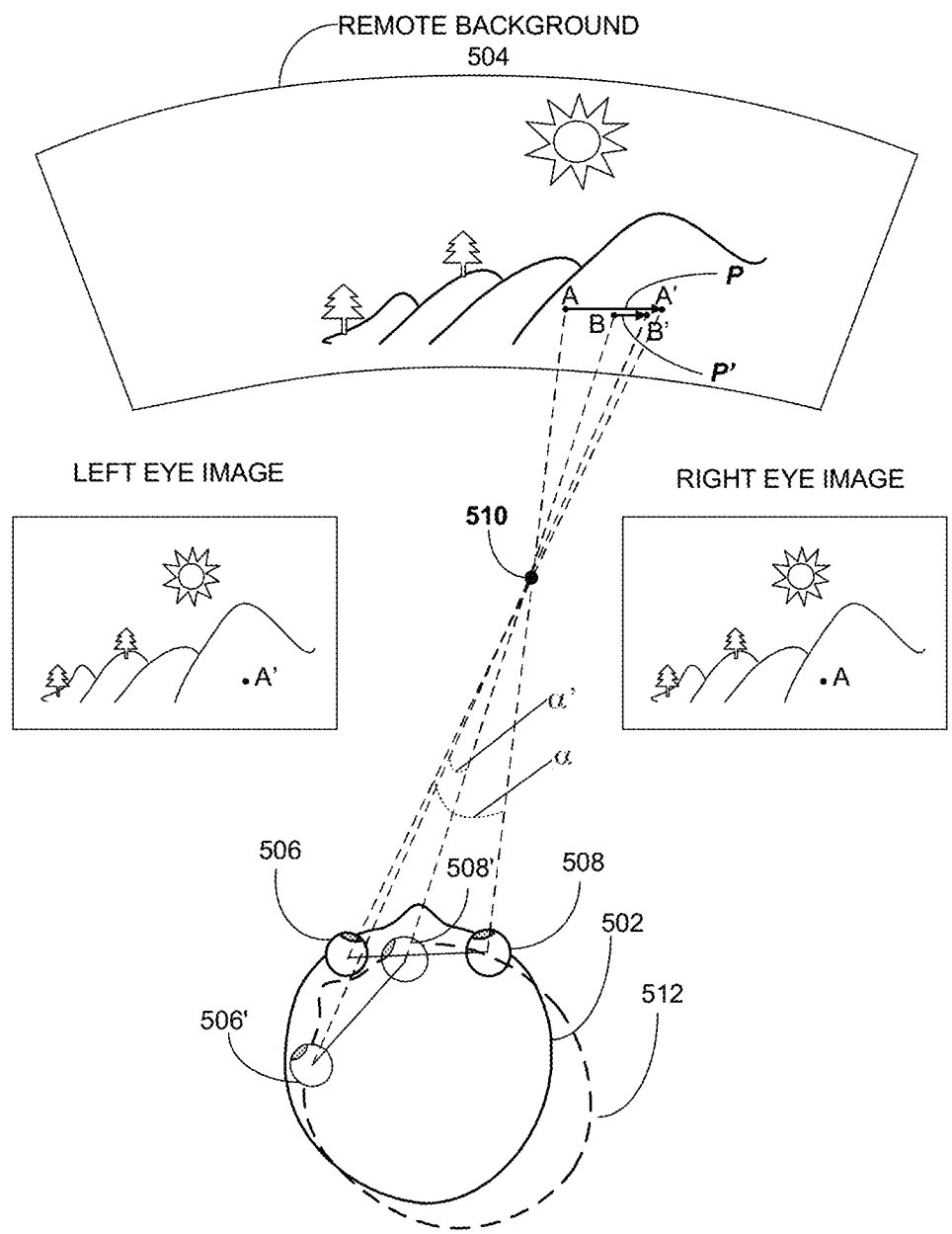
FIG. 5 illustrates the parallax effect and the concept of disclosed parallax vector based on the parallax effect in accordance with some embodiments described herein.

Human brains acquire the sense of 3D mainly from the parallax effect of the left and right eyes. FIG. 5 illustrates the parallax effect and the concept of disclosed parallax vector based on the parallax effect in accordance with some embodiments described herein. In the example environment shown in FIG. 5, an audience, represented by a top view of viewer's head shown in solid line 502, is looking straight ahead toward a remote background 504. It is well-known that the positions of objects in background 504 appear to be substantially the same to the left and right eyes 506 and 508 of the viewer in background 504. However, for a target point 510 near the viewer, its position in background 504 is different when viewed by the left and right eyes 506 and 508. More specifically, in the right-eye view, the position of target point 510 in the background is at a location A, whereas in the left-eye view, the position of target point 510 is in a background is at a location A'. We can define a vector P pointing from A to A' and between these two points as the "parallax vector" for target point 510. However, other embodiments can define the parallax vector of target point 510 as pointing from A' to A, or other variations of vector P without departing from the scope of the invention.

Conventional 3D video techniques work by independently recording left-eye video images and right-eye video images at the positions of the left eye 506 and right eye 508, and subsequently reproducing the left-eye video images and the right-eye video images to the audience's left eye and right eye, respectively. The disclosed techniques are based on using the above two sets of independent video images, but additionally including a signal channel of "parallax vector" for each target point in the recorded video images.

One application of the proposed parallax vector is to reconstruct different parallaxes in 3D panoramic video images when an audience views a 3D panoramic video from different angles. Again referring to FIG. 5, when the positions of the audience's left and right eyes and positions of the two stereoscopic cameras are substantially the same (referred to as the "original angle of view" hereinafter), as depicted by head position 502, then playing back of the 3D video images only requires presenting the captured left and right images to the left and right eyes 506 and 508 of the audience. However, when the audience changes to a different angle of view (e.g., as shown in FIG. 5, the viewer's head has turned to the left from position 502 to a new position 512 indicated by the dotted line), a change in the parallax caused by the new positions of the two eyes 506' and 508' will occur. In the illustrated example, the parallax corresponding to the new head position 512 is P'=B→B', which is smaller than the parallax vector P.

In some embodiments, the size of the parallax P is related to the angle Q between two lines that connect the two eyes 506 and 508 to target point 510 and can be expressed with the following relationship:

$$P \propto 2 \times \tan(\alpha/2). \quad (3)$$

When the relationships between the new positions of the audience's eyes (506' and 508') and the original positions (506 and 508) are known, it is possible to compute the angle of each target point made with the two eyes at the new positions, and as a result, the new parallax vector of each target point (e.g., target point 510) caused by the left and right eyes at the new angle of view can be determined. In some embodiments, the new parallax vector can be determined by scaling the original parallax vector associated with the original angle of view. In a specific implementation, the new parallax vector P' is computed by:

$$P' = P \times \tan(\alpha'/2)/\tan(\alpha/2), \quad (4)$$

wherein α' is the new angle made by the target object 510 and the two eyes at the new angle of view 512.

Applying Parallax Vector in Panoramic 3D Video Playback

Figure 6:
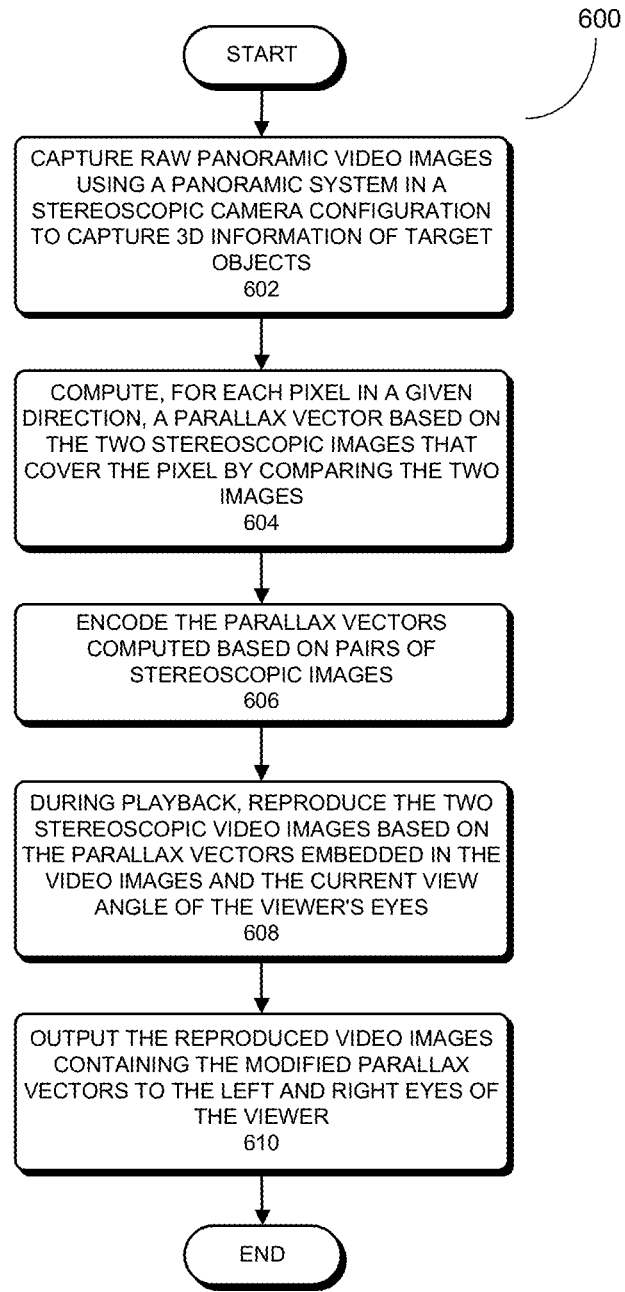
FIG. 6 presents a flowchart illustrating a process of reconstructing panoramic 3D video images based on using the disclosed parallax vectors in accordance with some embodiments described herein.

Some embodiments disclosed herein provide a more efficient technique for reconstructing panoramic 3D video images based on raw panoramic video images captured using stereoscopic camera configurations. FIG. 6 presents a flowchart illustrating a process 600 of computing panoramic 3D video images based on using the disclosed parallax vectors in accordance with some embodiments described herein. This process begins by capturing raw panoramic video images using a panoramic system in a stereoscopic camera configuration to capture 3D information of target objects (step 602). One of the example systems is described in conjunction with FIGS. 3A-3B. As a result, target objects in any given direction in panoramic images are captured by at least two cameras and show up in at least two stereoscopic video images.

Next, the process computes, for each pixel in a given direction, a parallax vector associated with the pixel based on the two stereoscopic images that "cover" the pixel by comparing the two stereoscopic images (step 604). As described in more detail below, this parallax vector includes a position, a size and a direction. As a result, a "parallax vector field" is generated for all the target objects covered by a pair of stereoscopic images.

Next, the parallax vectors computed based on pairs of stereoscopic images are encoded (step 606). In some embodiments, the computed parallax vectors can be encoded in a separate video stream using a single component for each pixel (e.g., when the raw videos are black and white videos), and the encoded parallax vectors can be transmitted in parallel with the original video signals. Alternatively, the computed parallax vectors can been coded by adding an additional color component for each pixel. For example, in applications where color pixels are represented in by Y-U-V components, the parallax vectors can be encoded to add one more color component for each pixel to form a V-Y-U-V representation for each pixel, wherein V stores the value for the parallax vector of the associated pixel. For example, V component can have a value ranging from −128 to 127. Note that, the encoded parallax vector field maintains a record of, for each pixel in the image, the position and the direction of the associated parallax vector between the two stereoscopic images.

In some embodiments, when shooting the panoramic videos, the described parallax vector field can be generated in real-time when the panoramic video data is being captured, and the computed parallax vectors are compressed and stored with the raw panoramic video images which are subsequently output or played back. In some embodiments, the parallax vectors are separately stored as extra information outside of the video signal channels. In other embodiments, the parallax vectors are embedded in video image files and encoded together with video image signals.

Further referred to the process 600 of FIG. 6, when playing back a pair of stereoscopic video images, the two stereoscopic video images are reproduced based on the parallax vectors embedded in the video images and the current view angle of the viewer's eyes (step 608). Next, the reproduced video images containing the modified parallax vectors are output to the left and right eyes of the viewer (step 610). Consequently, the viewer receives stereoscopic video images which vary with the angle of view, thereby enhancing the feel of reality and presence to the viewer/audience.

Figure 7:
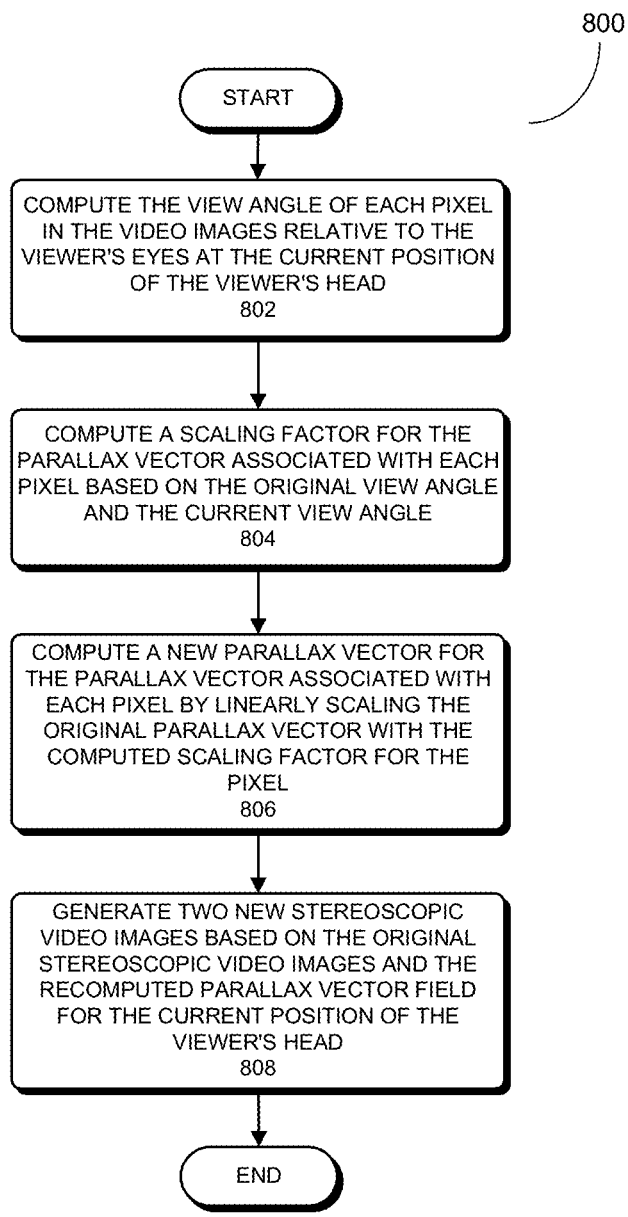
FIG. 7 presents a flowchart illustrating a process of reproducing a pair of stereoscopic video images during 3D video playback based on the parallax vectors embedded in the video images and the position of the viewer's eyes in accordance with some embodiments described herein.

FIG. 7 presents a flowchart illustrating a process 800 of reproducing a pair of stereoscopic video images during 3D video playback based on the parallax vectors embedded in the video images and the position of the viewer's eyes in accordance with some embodiments described herein. Because the viewer's eyes and hence the angle of view (or the "view angle") relative to the screen can move along with viewer's head during the 3D video playback, the system first computes the view angle of each pixel in the video images relative to the viewer's eyes at the current position of the viewer's head (step 802). For example, as illustrated in FIG. 5, the view angle for a target point 510 has changed from $\alpha$ to $\alpha'$ after the viewer's head moved from the normal position 502 (i.e., head facing forward with a direction normal to the screen/background) to the rotated position 512. Next, the system computes a scaling factor for the parallax vector associated with each pixel based on the original view angle (e.g., $\alpha$ in FIG. 5) and the current view angle (e.g., $\alpha'$ in FIG. 5) (step 804). One embodiment to compute the scaling factor is described above in conjunction with FIG. 5, e.g., by using equation (4). However, other techniques to compute the scaling factor can be used without departing from the scope of the present disclosure. The system then computes a new parallax vector for the parallax vector associated with each pixel by linearly scaling the original parallax vector with the computed scaling factor for the pixel (step 806). Next, the system generates two new stereoscopic video images based on the original stereoscopic video images and the recomputed parallax vector field for the current position of the viewer's head (step 808).

Notably, because of using the proposed parallax vector encoding, it becomes extremely convenient to linearly scale the parallaxes based on computed ratios. Moreover, the proposed technique does not require performing either the 3D model construction or computing the depth for the target objects, thus greatly reducing the amount of computation for 3D video image processing. In practical applications, the proposed computations can be performed by mid to high-end GPU graphics cards on high-definition videos in real time.

While this patent document contains many specifics, these should not be construed as limitations on the scope of any invention or of what may be claimed, but rather as descriptions of features that may be specific to particular embodiments of particular inventions. Certain features that are described in this patent document and attached appendix in the context of separate embodiments can also be implemented in combination in a single embodiment.

Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document and attached appendix should not be understood as requiring such separation in all embodiments.

Only a few implementations and examples are described and other implementations, enhancements and variations can be made based on what is described and illustrated in this patent document.

What is claimed is:

1. A computer implemented method of presenting three-dimensional (3D) video images to a viewer based on stereoscopic video images captured by a panoramic 3D imaging system comprising a first plurality of cameras, the method comprising:

arranging the first plurality of cameras evenly across a first 360° circular field with each camera facing a portion of the first 360° circular field to produce an entire 360° panoramas, wherein each camera's field of view overlaps with that of at least one other camera and each target object in any given direction is captured by at least two cameras in the panoramic 3D imaging system so that the each target object shows up in at least two binocular-vision/stereoscopic video images to be used to construct 3D images of the each target object;

receiving raw video images captured by the panoramic 3D imaging system, wherein the each target object within the raw video images appears in a pair of stereoscopic video images captured by the at least two cameras of the panoramic 3D imaging system in a stereoscopic camera configuration;

generating, for the each target object within the raw video images, a parallax vector based on each target point of the each target object appeared in the pair of associated stereoscopic video images, wherein generating the parallax vector includes: (1) determining a first location of the each target point projected onto a remote background based on one image of the pair of stereoscopic video images containing the target object; (2) determining a second location of the each target point projected onto the remote background based on the other image of the pair stereoscopic video images containing the target object; and (3) determining the parallax vector as a vector pointing from the first location to the second location in the remote background, wherein the each target point of the each target object is located between the viewer and the remote background and, wherein the generated parallax vectors are encoded with the pair of associated stereoscopic video images; and during panoramic 3D video image playback, reproducing each pair of stereoscopic video images in the raw video images based on updated encoded parallax vectors associated with the pair of stereoscopic video images and a current angle of view of a viewer's eyes, wherein reproducing each pair of stereoscopic video images includes: (a) determining a first angle $\alpha$ formed between the left and right eyes of the viewer and the each target point when the viewer is at a normal angle of view facing forward toward the screen; (b) determining a second angle $\alpha'$ formed between the left and right eyes of the viewer and the each target point when the viewer is situated as the determined current angle of view where viewers' head is moved to another direction; (c) computing a scaling factor $\tan(\alpha'/2)/\tan(\alpha/2)$ based on the first angle and the second angle to generate an updated parallax vector from the parallax vector; and (d) modifying the encoded parallax vectors by linearly scaling the encoded parallax vectors with the scaling factor $\tan(\alpha'/2)/\tan(\alpha/2)$ and yielding the updated encoded parallax vectors each to be $\tan(\alpha'/2)/\tan(\alpha/2)$ of each of the encoded parallax vectors, respectively; and outputting two video images in each pair of the reproduced stereoscopic video images to the viewer's left and right eyes, respectively at the current angle of view.

2. The method of claim 1, wherein reproducing each pair of stereoscopic video images includes:
    determining the current angle of view of the viewer's eyes with respect to a screen;
    reproducing the pair of stereoscopic video images based on the modified parallax vectors.

3. The method of claim 1, wherein computing the scaling factor $\tan(\alpha'/2)/\tan(\alpha/2)$ based on the first angle and the second angle includes computing a ratio of the second angle to the first angle.

4. The method of claim 1, wherein the second angle is smaller than the first angle if the determined current angle of view is different from the normal angle of view.

5. The method of claim 1, wherein each target object is a pixel associated with a pair of stereoscopic video images within the raw video images.

6. The method of claim 5, wherein encoding the generated parallax vectors with the pair of associated stereoscopic video images includes adding an additional component representing the generated parallax vector in a color-component representation for each pixel in the associated pair of stereoscopic video images.

7. The method of claim 1, wherein generating the parallax vectors is performed in real-time when the raw video images are being captured.

8. The method of claim 1, wherein the panoramic 3D imaging system comprises further comprise a second plurality of cameras and a third plurality of cameras; the method comprising:
    arranging the first plurality of cameras in a top plane, the second plurality of cameras in a middle plane under the top plane; and the third plurality of camera in a bottom plane under the middle plane;
    arranging the second plurality of cameras evenly across a second 360° circular field with each camera facing a portion of the second 360° circular field;
    arranging the third plurality of cameras evenly across a third 360° circular field with each camera facing a portion of the third 360° circular field, wherein
    in the top plane, each camera's field of view overlaps with that of at least one other camera of the second plurality of cameras,
    in the bottom plane, each camera's field of view overlaps with that of at least one other camera of the third plurality of cameras;
    the each target object in any given direction is captured by the at least two cameras of the panoramic 3D imaging system so that the each target object shows up in at least two binocular-vision/stereoscopic video images to be used to construct 3D images of the each target object; and
    the combination of the first plurality of cameras, the second plurality of cameras and the third plurality of cameras captures 360°×180° full spherical panoramic stereoscopic video images to produce the entire 360° panoramas.

9. A non-transitory computer-readable storage medium storing instructions that when executed by a computer cause the computer to perform a method for presenting three-dimensional (3D) video images to a viewer based on stereoscopic video images captured by a panoramic 3D imaging system comprising a first plurality of cameras, the method comprising:
    arranging the first plurality of cameras evenly across a 360° field with each camera facing a portion of the 360° field to produce an entire 360° panoramas, wherein each camera's field of view overlaps with that of at least one other camera and
    each target object in any given direction is captured by at least two cameras in the panoramic 3D imaging system so that the each target object shows up in at least two binocular-vision/stereoscopic video images to be used to construct 3D images of the each target object;
    receiving raw video images captured by the panoramic 3D imaging system, wherein the each target object within the raw video images appears in a pair of stereoscopic video images captured by the at least two cameras of the panoramic 3D imaging system in a stereoscopic camera configuration;
    generating, for each target object within the raw video images, a parallax vector based on each target point of the each target object appeared in the pair of associated stereoscopic video images, wherein generating the parallax vector includes: (1) determining a first location of the each target point projected onto a remote background based on one image of the pair of stereoscopic video images containing the target object; (2) determining a second location of the each target point projected onto the remote background based on the other image of the pair stereoscopic video images containing the target object; and (3) determining the parallax vector as a vector pointing from the first location to the second location in the remote background and, wherein the generated parallax vectors are encoded with the pair of associated stereoscopic video images; and
    during panoramic 3D video image playback,
    reproducing each pair of stereoscopic video images in the raw video images based on updated encoded parallax vectors associated with the pair of stereoscopic video images and a current angle of view of a viewer's eyes, wherein reproducing each pair of stereoscopic video images includes: (a) determining a first angle $\alpha$ formed between the left and right eyes of the viewer and the each target point when the viewer is at a normal angle of view facing forward toward the screen; (b) determining a second angle $\alpha'$ formed between the left and right eyes of the viewer and the each target point when the viewer is situated as the determined current angle of view; (c) computing a scaling factor $\tan(\alpha'/2)/\tan(\alpha/2)$ based on the first angle and the second angle to generate an updated parallax vector from the parallax vector; and (d) modifying the encoded parallax vectors by linearly scaling the encoded parallax vectors with the scaling factor $\tan(\alpha'/2)/\tan(\alpha/2)$ and yielding the updated encoded parallax vectors each to be $\tan(\alpha'/2)/\tan(\alpha/2)$ of each of the encoded parallax vectors, respectively; and
    outputting two video images in each pair of the reproduced stereoscopic video images to the viewer's left and right eyes, respectively at the current angle of view.

10. The non-transitory computer-readable storage medium of claim 9, wherein reproducing each pair of stereoscopic video images includes:
    determining the current angle of view of the viewer's eyes with respect to a screen; and
    reproducing the pair of stereoscopic video images based on the modified parallax vectors.

11. The non-transitory computer-readable storage medium of claim 9, wherein computing the scaling factor tan(α'/2)/tan(α/2) based on the first angle and the second angle includes computing a ratio of the second angle to the first angle.

12. The non-transitory computer-readable storage medium of claim 9, wherein the second angle is smaller than the first angle if the determined current angle of view is different from the normal angle of view.

13. The non-transitory computer-readable storage medium of claim 9, wherein each target object is a pixel associated with a pair of stereoscopic video images within the raw video images.

14. The non-transitory computer-readable storage medium of claim 13, wherein encoding the generated parallax vectors with the pair of associated stereoscopic video images includes adding an additional component representing the generated parallax vector in a color-component representation for each pixel in the associated pair of stereoscopic video images.

15. The non-transitory computer-readable storage medium of claim 9, wherein generating the parallax vectors is performed in real-time when the raw video images are being captured.

16. The non-transitory computer-readable storage medium of claim 9, wherein the panoramic 3D imaging system comprises further comprise a second plurality of cameras and a third plurality of cameras; the method comprising:

arranging the first plurality of cameras in a top plane, the second plurality of cameras in a middle plane under the top plane; and the third plurality of camera in a bottom plane under the middle plane;

arranging the second plurality of cameras evenly across a second 360° circular field with each camera facing a portion of the second 360° circular field;

arranging the third plurality of cameras evenly across a third 360° circular field with each camera facing a portion of the third 360° circular field, wherein in the top plane, each camera's field of view overlaps with that of at least one other camera of the second plurality of cameras, in the bottom plane, each camera's field of view overlaps with that of at least one other camera of the third plurality of cameras;

the each target object in any given direction is captured by the at least two cameras of the panoramic 3D imaging system so that the each target object shows up in at least two binocular-vision/stereoscopic video images to be used to construct 3D images of the each target object; and the combination of the first plurality of cameras, the second plurality of cameras and the third plurality of cameras captures 360°×180° full spherical panoramic stereoscopic video images to produce the entire 360° panoramas.

* * * * *